(12) United States Patent
Pössnicker (10) Patent No.: US 11,652,390 B2
(45) Date of Patent: May 16, 2023

(54) ELECTRIC MOTOR

(71) Applicant: INTER CONTROL Hermann Köhler Elektrik GmbH & Co. KG, Nuremberg (DE)

(72) Inventor: Peter Pössnicker, Heroldsberg (DE)

(73) Assignee: INTER CONTROL HERMANN KÖHLER ELEKTRIK GMBH & CO. KG, Nuremberg (DE)

( * ) Notice: Subject to any disclaimer, the term of this patent is extended or adjusted under 35 U.S.C. 154(b) by 74 days.

(21) Appl. No.: 16/973,364

(22) PCT Filed: Mar. 13, 2019

(86) PCT No.: PCT/EP2019/056345
§ 371 (c)(1),
(2) Date: Dec. 8, 2020

(87) PCT Pub. No.: WO2019/233643
PCT Pub. Date: Dec. 12, 2019

(65) Prior Publication Data
US 2021/0273530 A1    Sep. 2, 2021

(30) Foreign Application Priority Data
Jun. 8, 2018    (DE) .................... 20 2018 103 227.5

(51) Int. Cl.
*H02K 11/25* (2016.01)
*H02K 11/35* (2016.01)
*H01Q 7/00* (2006.01)

(52) U.S. Cl.
CPC ............ *H02K 11/25* (2016.01); *H02K 11/35* (2016.01); *H01Q 7/00* (2013.01); *H02K 2211/03* (2013.01)

(58) Field of Classification Search
CPC .... H02K 2213/06; H02K 11/25; H02K 11/35; H02K 2211/03; H02H 7/0852; H01Q 7/00
See application file for complete search history.

(56) References Cited

U.S. PATENT DOCUMENTS 5,257,863 A    11/1993   Chu et al.
2002/0038192 A1    3/2002   Klaar
(Continued)

FOREIGN PATENT DOCUMENTS

| DE | 44 11 712 A1 | 10/1995 |
| DE | 10 2011 017 532 A1 | 10/2012 |
| EP | 3 301 654 A1 | 4/2018 |

OTHER PUBLICATIONS

Das 686 MHz highlighted (Year: 2022).*
(Continued)

*Primary Examiner* — Tulsidas C Patel
*Assistant Examiner* — Viswanathan Subramanian
(74) *Attorney, Agent, or Firm* — Merchant & Gould P.C.

(57) ABSTRACT

A compact electric motor (1) includes a housing (2), a stator (3), a rotor (4) with a rotor winding (5) or permanent magnets located thereon. A thermal protection device protects the electric motor against overheating. A sensor unit (6) is provided as a thermal protection device. The sensor unit (6) includes a temperature sensor (7) for detecting temperature-based measurement values, a radio module (8) with an antenna (8a) for sending sensor signals of temperature-based measurement values or data or information derived therefrom by radio to an external receiving unit (9). The sensor unit (6) has a memory (13) and a microcontroller (10). The sensor unit (6) is a self-supplying assembly.

12 Claims, 5 Drawing Sheets

(56) References Cited

U.S. PATENT DOCUMENTS

| | | |
|---|---|---|
| 2005/0035874 A1 | 2/2005 | Hall et al. |
| 2008/0195261 A1* | 8/2008 | Breed ................. B60R 11/0241 |
| | | 701/2 |
| 2011/0273121 A1 | 11/2011 | Wan et al. |
| 2014/0194140 A1* | 7/2014 | Takano ................. H04W 4/029 |
| | | 455/456.1 |
| 2017/0163200 A1* | 6/2017 | Nardin ................. H04B 5/0056 |
| 2019/0313630 A1* | 10/2019 | Stoll ..................... A01M 29/28 |

OTHER PUBLICATIONS

Das 686Mhz highlighted translated (Year: 2022).*
International Search Report and Written Opinion of the International Searching Authority for International Patent Application No. PCT/EP2019/056345 dated Jun. 21, 2019, 13 pages.
Patz, C., "Das 868-Mhz-Frequenzband optimal nutzen", 16-17 (Feb. 2015); retrieved from the Internet: https://www.tu-chemnitz.de/etit/sse/szee/rsrc/elektroniknetArtike1022015.pdf; Applicant hereby brings attention to the Examiner that the reference was cited in the International Search Report, which is enclosed. Since the International Search Report is in English, no English translation of the listed reference is required, pursuant to MPEP §609.04(a)III.
"Wireless measurement technology: Product Catalogue", Heinz® Messwiderstande, 1-16 (admitted prior art as of 2018).

* cited by examiner

ELECTRIC MOTOR

This application is a National Stage Application of PCT/EP2019/056345, filed 13 Mar. 2019, which claims benefit of Serial No. 20 2018 103 227.5, filed 8 Jun. 2018 in Germany and which applications are incorporated herein by reference. To the extent appropriate, a claim of priority is made to each of the above-disclosed applications.

The present innovation relates to a system comprising an electric motor, especially a universal motor for AC and/or DC and brushless motor, and an external receiving unit. A typical field of application for universal motors is drives with speed control. Brushless types are required where high performance is required with a small, compact construction.

TECHNOLOGICAL BACKGROUND

Electric motors having a compact construction are specially trimmed for efficiency. Efficiency levels of up to 95% are often achieved. They often have a cylindrical shape. Electric motors of sizes in the range of, for example, 30×60 mm (cylindrical design) are able to deliver up to 1,000 watts of power in a short amount of time. In many cases, a fan wheel is connected to the motor shaft (rotor) to ensure a cooling effect. In the event of a rotor blockage, however, the resulting cooling effect is eliminated.

Universal motors, which can be operated with alternating current (AC) and direct current (DC), have a collector as a typical feature. The rotor carries the armature winding, which, depending on the design, is paired with a stator winding or a permanent magnet. This type of motor is used in particular in the tool sector and especially in small household appliances (paddle mixers, coffee machines, drills and the like), since this type of motor provides precise speed control. The designs and performance ranges are on a similar order of magnitude as with brushless motors, but with a lower degree of efficiency.

Basically, there is currently no effective thermal protection for the armature in motors of the aforementioned design available on the market, regardless of whether the armature is provided with an armature winding or with permanent magnets, such as is provided in the brushless types. Their permanent magnets have the negative property of losing their magnetic field as the temperature rises, so that the driving power must be increased in closed control loops in order to compensate for the loss of speed. This results in rapid overheating of the armature or permanent magnets or in damage to the wire insulation within the armature.

Temperatures in the range of 80-130° C. are to be regarded as "normal" and dependent on the performance class. The wire insulation commonly used is made of polyurethane (critical temperature: 155° C.), polyesterimide (critical temperature: 200° C.) and polyimide (critical temperature: 300° C.). The specified critical temperatures are maximum thermal load values at which no sustained structural damage occurs. The continuous use temperature is approx. 75% of this. Depending on the motor performance class/design and the operating mode, temperatures of over 200° C. on the armature winding are reached within 15 seconds when there is a blockage.

So-called motor protection switches are known which only detect the load via the power consumed or in connection with the temperature of the motor housing. This variant is characterized by a temporal (thermal) inertia, which cannot be used in the case of the motor types described above: Depending on the compact construction and performance class, a maxim rotor blockage of $12s$ is allowed when driven with nominal load. If the motor has been partially overloaded before the rotor is stopped, this maximum time is less. In addition, the wire insulation can melt and cause a fire as a result of the short circuits that are created.

The current countermeasures to the above problems are that motors are usually oversized at the expense of manufacturing costs, weight and housing.

DOCUMENTED PRIOR ART

An electric motor according to the preamble of claim 1 is known from U.S. Pat. No. 5,257,863. Specifically, this document shows an electronic rotor temperature sensor for an electric motor or generator. To detect the temperature, a plurality of sensor units with an associated radio transmitter is arranged in opposition on the rotor in recesses on the rotor provided for this purpose in order to avoid an imbalance. Antennas, which receive analog radio signals (bursts) from the associated sensor unit and forward them via wiring to a connector, where they can be tapped, are positioned directly on the stator of the electric motor or generator at the corresponding rotational positions of the sensor units.

In the arrangement known from US 2002/0038192 A1, digital temperature sensors are arranged on the rotor winding. The digital measurement signals of the temperature sensors are transmitted optically by means of infrared signals to a communication unit and from there fed to a processing unit via a busbar. The electrical power for the temperature sensors can be provided by a battery, by a solar cell or by leakage induction from the electric fields.

Christian Patz, "Das 868-Mhz-Frequenzband optimal nutzen [Optimal use of the 868 Mhz frequency band," (20150201), pages 16-17, URL: https://www.tu-chemnitz.de/etit/sse/szee/rsrc/elektroniknetArtikel022015.pdf, describes the use of the 868 MHz frequency band for sensor and actuator networks.

From US 2005/0035874 A1 a drill rod is known, with a network node located in each of the lower and upper drill rod regions, wherein operating data including sensor data can be transmitted from the lower network node to the upper network node in the form of data packets.

EP 3 301 654 A1 describes a device for monitoring the temperature of a rotating aircraft component which has a temperature sensor arranged in the vicinity of the rotating aircraft component. The temperature sensor data are fed to a memory via a line connection and stored there. The stored data are then transmitted wirelessly to a remote device.

2011/273121 A1 discloses an electric machine having a stator and a rotor with temperature detecting. The machine includes a temperature sensor with a transmitter located on the rotor which transmits the sensor data via RFID to a receiver, which is positioned near the transmitter either inside the machine housing or on its outside.

From DE 10 2011 017 532 A1 a commutator for an electrical machine, in particular for a starter of an internal combustion engine, is known in which a thermally deformable short-circuit element is arranged on the collector as a thermal overload protection device, which has an electrically conductive contact bridge, which when it exceeds a limit temperature causes a short circuit on the collector. The triggering of the short circuit depends directly on the temperature of the armature.

DE 44 11 712 A1 describes a device for protecting against thermal overload of a small electric motor for high thermal load capacity using a bimetal element which abruptly opens the motor feed circuit when it is heated to a certain degree.

Problem Addressed by the Present Invention

The task of the present innovation is to provide improved thermal protection for the types of engines mentioned above.

Solution of the Problem

The invention makes it possible, particularly in the case of electric motors of compact construction with high power density, to provide improved thermal protection for the aforementioned motor types that detects the temperature buildup directly at the point of origin and thus with the lowest delay and highest accuracy. This is particularly important in the case of electric motors in which, due to a hermetic encapsulation, the integration of a high-performance cooling system is impossible or only possible with difficulty. An active sensor (in the sense of measuring the temperature, data processing and transmission) is placed directly at the point with the expected fastest temperature development.

According to the invention, the sensor unit is therefore attached directly to a moving part or directly to the rotor and is thus able to detect the temperature directly on the rotor. The operating temperatures in the rotor are particularly critical. With the invention, the operating temperatures on the rotor can be transmitted directly to an external receiving unit. The sensor unit can for example be arranged on the rotor between two winding courses or also be accommodated in one of the many longitudinal recesses of the rotor in the region of a winding course.

The sensor unit as an assembly is implemented in particular by the electrical power for operating the sensor unit either being induced from the alternating fields or drawn off via a tap on a collector, if one is present. Induction from the alternating fields is particularly suitable for so-called brushless electric motors that do not have a collector.

It is especially advantageous if an antenna with high polarization is used, such as a so-called loop antenna or ceramic antenna. Due to their design, these have a high polarization and can also be easily attached to circuit boards in the required miniaturization. In particular, a ceramic antenna is also particularly insensitive to external influences, such as thermal influences. They are also light in weight.

An SRD (Short Range) ISM band is preferably used as the working frequency, since these radio transmission bands only require a small amount of power. The so-called ISM 868 MHz band is particularly useful.

Because the radio power of the radio transmission is set at least essentially to a radius of up to 30 m, preferably up to 20 m, especially preferably up to 10 m, this establishes a radio transmission with low power requirements that supports the sensor unit as a self-supplying component. Within these radii, it should still be possible to evaluate the sensor signal, at least essentially, without signal interference. In addition, the signal should be able to penetrate housing insulation or shielding.

According to the invention, the temperature-based measurement signals or data or information derived therefrom are sent in the form of data packets at spaced apart time intervals.

According to the invention, the data packets are repeatedly sent one after the other in order to ensure that the data are reliably received in the event of a disturbance caused, for example, by an electric motor-related disturbance.

To compensate for the directional effect of the antenna located on the rotor, the sensor unit transmits an identical data packet at least twice at a rotor offset of a 90°+/−25° angle of rotation, preferably at least a 90°+/−15° angle of rotation, especially preferably at least a 90°+/−5° angle of rotation. This allows an increased reception quality to be achieved.

The sensor unit expediently executes a tuning routine for the antenna to transmit the sensor signals or the data or information derived therefrom by radio to the external receiving unit. This is a short calibration process for the antenna, which tunes the antenna to the given conditions. In this way, the detuning of the antenna due to the installation in the vicinity of the motor is eliminated or at least significantly reduced.

The tuning routine of the antenna is expediently performed either during the initial start-up and/or during operation, preferably before a data packet is sent. The adjustment parameters determined by the tuning (in particular the capacity of the output circuit of the sensor unit) are preferably stored permanently in the memory of the sensor unit, so that the tuning process can be reduced in time.

The radio transmission of the sensor unit is determined by the fact that a maximum transmission power of 30 mW, preferably 20 mW, especially preferably 10 mW and/or a data rate of 50 kbit/s, preferably 40 kbit/s, especially preferably 30 kbit/s is provided. This definition takes into account the fact that the sensor unit is a self-supplying assembly, i.e. power is only available to a limited extent.

For the same reason and also due to the specifications of the ISM 868 MHz band, the length of the data packet for transmission is preferably less than or equal to 0.1% of the holding time of the channel.

With the sensor unit, additional measured values or data or information derived therefrom can be transmitted. These include in particular:
the individual address of the sensor unit and/or
test data for parity measurement and/or
the rotational speed of the rotor and/or
vibration data of the rotor axis or the rotor and/or
positive and/or negative acceleration and/or
Information about a blockage of the rotor and/or
Data on operating states above a limit temperature, preferably as a time measurement and/or
Sensor unit data regarding self-supply and energy management.

On the basis of the temperature-based measured values and preferably the further additional measured values or data or information derived therefrom, an optimized control of the power and/or the operation of the electric motor can be carried out, and as a result, on the one hand, the operational reliability of an electric motor of the type mentioned above and, on the other hand, the operational effectiveness can be significantly improved.

DESCRIPTION OF THE INVENTION USING EMBODIMENTS

The invention is explained in more detail below in reference to embodiments, in which:

FIG. 4 is a greatly simplified, schematic representation of the individual functional elements of the sensor unit as an assembly with induction coil (FIG. 4a) or tap of the collector (FIG. 4b)

Figure 1:
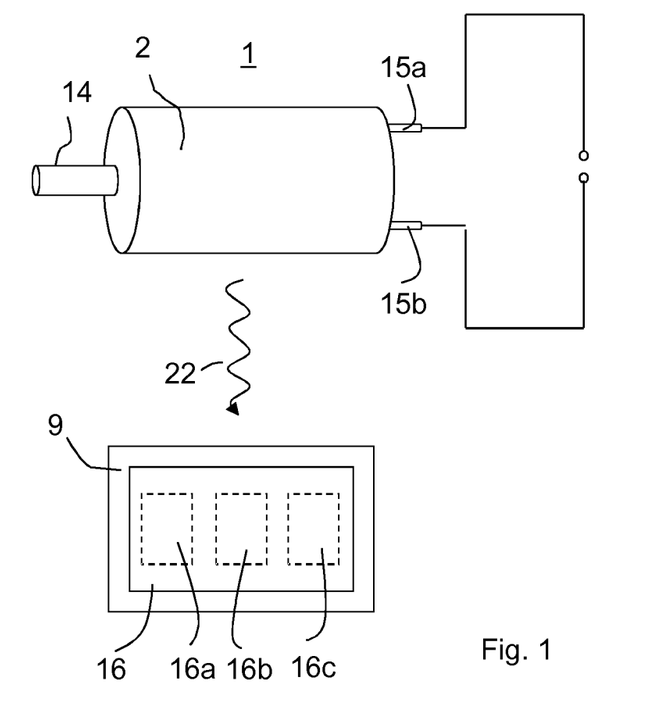
FIG. 1 is a greatly simplified, schematic representation of a system according to the invention of an electric motor having a sensor device for reading out the operating temperature of the electric motor on an external receiving unit.

Reference number 1 in FIG. 1 shows an electric motor in compact construction having a motor shaft 14 protruding at its end face, a cylindrical housing 2 and connections 15a, 15b for connecting the electric motor 1 to an electronic circuit.

Electric motors having a compact construction are usually used in the tool area (e.g. drills) and in small household appliances (paddle mixers, coffee machines and the like), as they allow precise speed control with the given motor design. Such electric motors are trimmed for efficiency with the given compact construction. Efficiency levels of up to 95% are often achieved. Compact motors usually have a cylindrical design. They are able to deliver up to 1,000 watts of power in a short amount of time. Compact electric motors also include universal motors that can be operated with AC and DC. These motors usually have a collector, the rotor carrying the so-called armature winding, depending on the design paired with a stator winding or permanent magnets.

The electric motor 2 of the system according to the invention comprises a sensor unit (shown in FIG. 2) having a temperature sensor for detecting temperature-based measured values, wherein these values or data or information derived therefrom are transmitted via a unidirectional radio link 22 to an external receiving unit 9 and are displayed there on a display 16. In addition to the aforementioned measured values or data, further measured values of the sensor unit or data or information derived therefrom can be transmitted within the framework of the radio link 22. The temperature or measured values, data and information that are still to be transmitted can be displayed in specially assigned display regions 16a, 16b and 16b. The numerical data can also be passed on to downstream regulator/control units via interfaces such as I2C or SPI bus.

Figure 2:
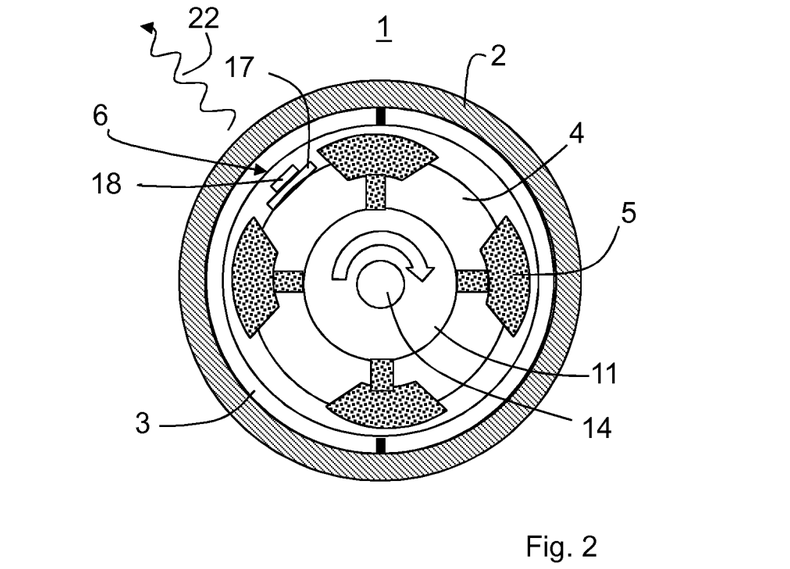
FIG. 2 is a greatly simplified, schematic representation of the individual functional units of an embodiment of the system according to the invention in partial sectional view.

FIG. 2 shows the essential functional elements of the electric motor 1. The electric motor 1 comprises a cylindrical housing 2 in which a stator 3 is located. The stator 3 is shown only schematically in FIG. 2 and can be implemented either by a stator winding or by permanent magnets (in each case not shown in FIG. 2). The opposite regions of the stator 3 are polarized differently.

Inside the stator 3 is the rotor 4, to which the motor shaft 14 is connected in a rotationally fixed manner. A collector 11 can also be located on the front side at the brush tap, which collector is there to tap the electrical power from brushes 23 (cf. FIG. 3) arranged inside the housing 2.

The collector 11 supplies the rotor windings 5 with electrical power. The respective rotor winding 5 comprises individual current-carrying wires, each of which is surrounded by wire insulation, for example made of polyurethane. Polyurethane has a thermal load capacity of approx. 155° C. At this temperature there is still no lasting structural damage.

According to the present invention, a sensor unit 6 for detecting temperature-based measured values is located directly on the rotor 4 as a thermal protective device. In the embodiment shown in FIGS. 2 and 3, the sensor unit 6 is located in the outer region of the rotor 4, for example in a region between two parallel rotor windings 5 or alternatively on the upper side of a rotor winding 5. The sensor unit 6 thus rotates with the rotor 4. For example, the sensor unit 6 can be applied as an integrated circuit 18 on a circuit board 17.

Figure 3:
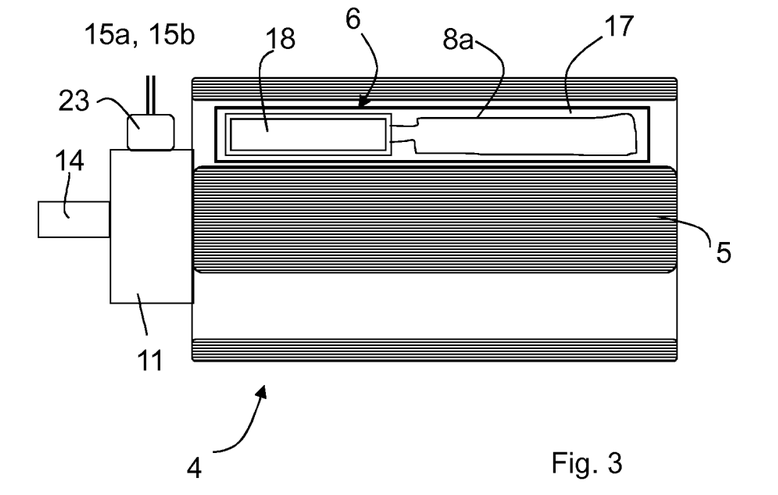
FIG. 3 is a greatly simplified, schematic top view of the rotor of the electric motor according to FIG. 2.

To transmit sensor signals, temperature-based measured values or data or information derived therefrom by radio to the external receiving unit, the sensor unit 6 comprises an antenna 8a, which can be printed on the circuit board 17, for example as a loop antenna, as shown in FIG. 3. Alternatively, a so-called ceramic antenna can also be provided as antenna 8a. Both a loop antenna and a ceramic antenna have a very high polarization due to their design.

As can be seen from FIG. 2, the radio signal of the radio link 22 is sent out by the sensor unit 6 in the radial direction.

The sensor unit 6 is an elongated component and runs in the longitudinal direction of the rotor 4. It is suitably connected to the rotor in a manner fixed against movement, for example glued. This prevents vibrations.

Figure 4A:
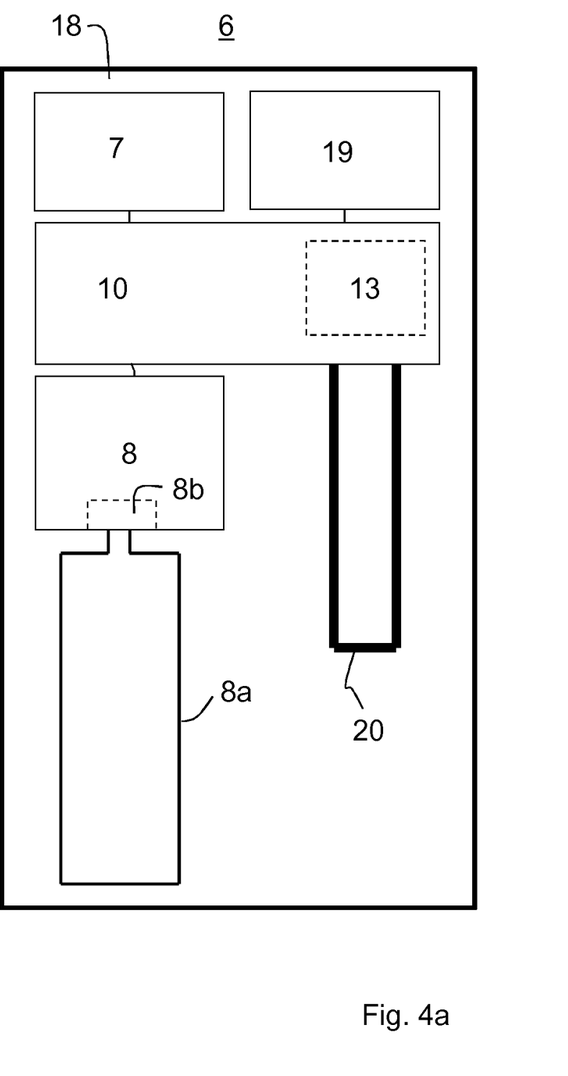

FIG. 4a shows the essential functional components of the sensor unit 6 in a greatly simplified schematic representation. The sensor unit 6 comprises a microcontroller 10, which preferably has a memory 13. Furthermore, a temperature sensor 7 is provided which is able to detect the temperature in the region of the rotor 4 and to generate a temperature-based measured value corresponding to the temperature. Furthermore, the sensor unit 6 comprises a radio module 8, with which the temperature-based measured value or data or information derived therefrom can be transmitted to the external receiving unit 9 via the radio link 22.

According to the invention, the sensor unit 6 is a self-supplying component or a self-supplying assembly. In the embodiment shown in FIG. 4a, the sensor unit 6 receives its operating power by means of induction via the coil 20 from the alternating fields of the stator 3. This operating power must be available in a memory in sufficient reserve for at least a short period of time in order to transmit the information to the external receiving module 9 cyclically, if possible at intervals of a few seconds. For this purpose, the sensor unit 6 comprises, for example in the region of the microprocessor, an energy storage device (not shown), for example in the form of a chargeable capacitor.

Furthermore, the sensor unit 6 can also include further sensors, the measured values or signals of which are additionally transmitted to the external receiving unit 9. A so-called acceleration sensor 19 can preferably be provided which generates data regarding the acceleration (negative/positive), the rotational speed and/or vibrations of the rotor axis.

Since the antenna can be detuned by installing the sensor unit 6 in the vicinity of the rotor 4, the sensor unit 6 expediently runs through a tuning routine of the antenna via a brief calibration process for the antenna. This calibration process may only take a short time (e.g. 2 ms). It can be performed during the initial start-up or later, for example before a data packet is transmitted. As part of this tuning routine of the antenna 8a, adjustment parameters are determined, in particular the capacity of an output antenna circuit 8b of the radio module 8, which can be permanently stored in the memory 13.

Figure 5:
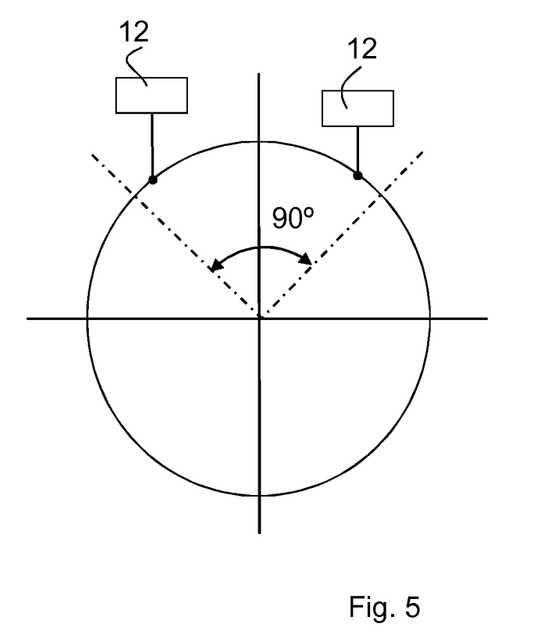
FIG. 5 is an exemplary, highly simplified, schematic representation of the transmission instants of a data packet along a rotor rotation.

The measured values and the data based thereon are transmitted cyclically or continuously in the form of data packets to the receiving unit. In order to compensate for the directional effect (see FIG. 2) of the antenna 8a, the sensor unit 6 should transmit the respective data packet at least twice if possible at a rotor offset of about 90°±25° rotational angle, preferably of at least about 90°±15° rotational angle, especially preferably of at least about 90°±5° rotational angle. In the transmission type shown in FIG. 5, one and the same data packet 12 is sent twice within an angle of rotation of 90°. This greatly increases the likelihood of good reception.

The length of the data packet must be coordinated with the regulations in the relevant frequency range and should not exceed 0.1% of the holding time. In coordination with a cyclical detection of measured values, for example every 4 s, this means a data package of max. 4 ms. Over 30 kbit/s, there would be about six values with 8-bit resolution (net transferable). The relevant data packet expediently also contains an individual address of the sensor device and/or further test data for the parity/plausibility check. The data rate is to be selected so that the power consumption of the transmission can be kept low, but there is still sufficient interference immunity on the side of the receiving unit 9. For the transmission of the measured values or data, a maximum transmission power of 30 mW, preferably 20 mW, especially preferably 10 mW and/or a data rate of 50 kbit/s, preferably 40 kbit/s, especially preferably 30 kbit/s is provided. A performance of 10 mW with a data rate of 30 kbit/s delivers good results here, for example.

In addition to the temperature-based values or data, the sensor unit 6 can transmit additional measured values or data or information derived therefrom which contain at least one of the following items:
- the individual address of the sensor unit (6) and/or
- the test data for parity measurement and/or
- the rotational speed of the rotor (4) and/or
- vibration data of the rotor axis or of the rotor (4) and/or
- positive and/or negative acceleration and/or
- a blockage of the rotor (4) and/or
- Data on operating states above a limit temperature, preferably as a time measurement and/or
- Sensor unit data regarding self-supply and energy management.

Figure 4B:
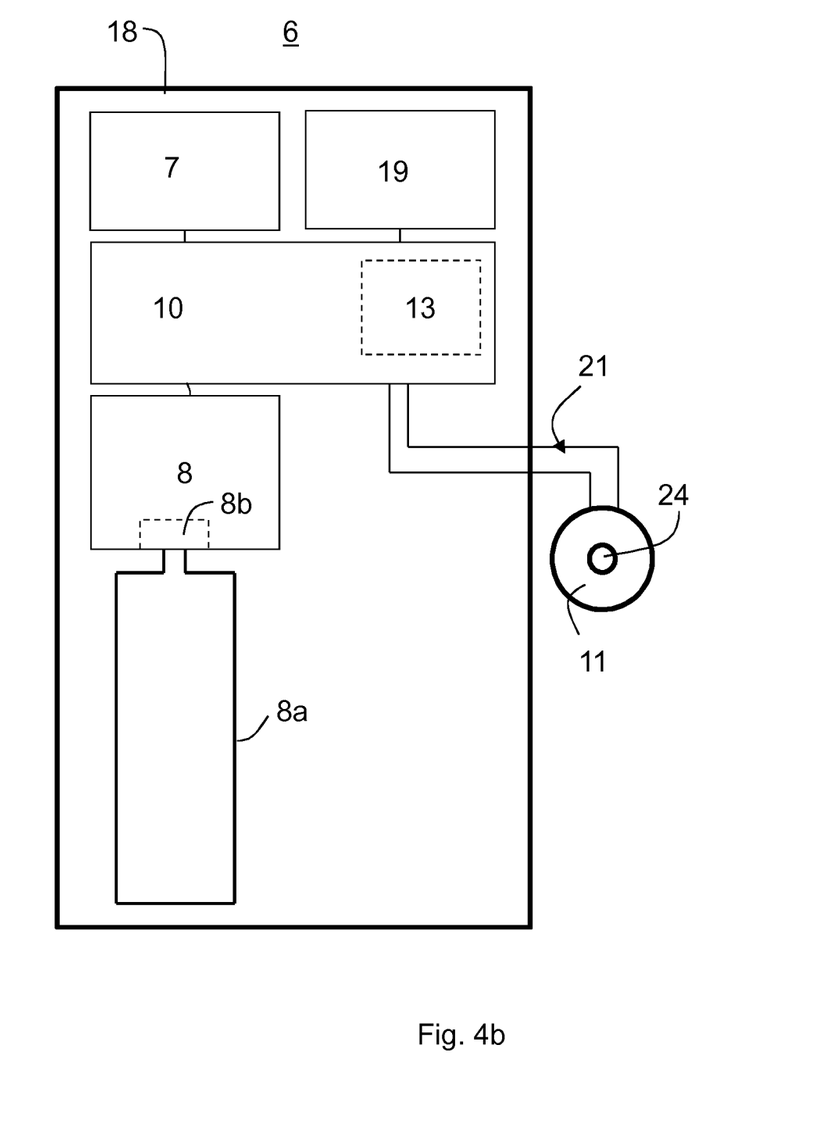

FIG. 4*b* shows an alternative embodiment of the sensor unit 6. In this embodiment, the operating power for the sensor unit 6 is made available from a tap 21 on the collector 11. In this embodiment, too, a separate power supply does not have to be provided for the sensor unit 6.

It is expressly pointed out that combinations of individual features with one another or individual features with partial feature groups are expressly regarded as essential to the invention and are included in the disclosure content of the application.

LIST OF REFERENCE SIGNS

1 Electric motor
2 Housing
3 Stator
4 Rotor
5 Rotor winding
6 Sensor unit
7 Temperature sensor
8 Radio module
8*a* Antenna
8*b* Output antenna circuit
9 Receiving unit
10 Microcontroller
11 Collector
12 Data packet
13 Storage
14 Motor shaft
15*a* Terminal
15*b* Terminal
16 Display
16*a* Display region
16*b* Display region
16*c* Display region
17 Circuit board
18 Integrated circuit
19 Accelerometer
20 Coil
21 Tap
22 Radio link
23 Brush

The invention claimed is:

1. A system comprising an electric motor and an external receiving unit, the electric motor comprising a housing, a stator, a rotor with a rotor winding or permanent magnets, a thermal protection device to protect the electric motor from overheating, the thermal protection device comprising a sensor unit housed on the rotor, the sensor unit having a temperature sensor for detecting temperature-based measured values, a radio module with antenna for transmitting sensor signals of temperature-based measured values, and a microcontroller, and the sensor unit receiving operating power by induction from the coil and stator,
wherein the sensor unit comprises a memory, and data derived from the temperature-based measured values are transmitted to the external receiving unit via radio, the sensor unit being configured to transmit data packets at spaced apart time intervals to transmit the sensor signals of temperature-based measured values or data or information derived therefrom, and the sensor unit being configured to transmit a data packet repeatedly in successions;
wherein the sensor unit transmits a same data packet at least twice over a specified rotor offset.

2. The system according to claim 1, wherein the electrical power for operating the sensor unit is induced from alternating fields or is drawn off via a tap of a collector.

3. The system according to claim 1, wherein the antenna comprises a loop antenna or a ceramic antenna.

4. The system according to claim 1, wherein an SRD (short range) ISM band is provided as the working frequency.

5. The system according to claim 1, wherein the radio power of the radio transmission is set at least essentially to a radius of up to 30 m.

6. The system according to claim 1, wherein the sensor unit carries out a tuning routine of the antenna for transmitting the sensor signals or the data or information derived therefrom via radio to the external receiving unit.

7. He system according to claim 6, wherein the tuning routine of the antenna is performed during initial start-up and/or during operation before a data packet is sent.

8. The system according to claim 6, wherein the adjustment parameters determined from the tuning routine of the antenna are stored in the memory of the sensor unit.

9. The system according to claim 1, wherein a maximum transmission power of 30 mW, and/or a data rate of 50 kbit/s is provided for the transmission.

10. The system according to claim 1, wherein for the transmission, a duration of the data packet is less than or equal to 0.1% of a holding time of the channel.

11. The system according claim 1, wherein the sensor unit is configured to transmit measured values or data or information derived therefrom which contain the following:
an individual address of the sensor unit and/or test data for parity measurement and/or rotational speed of the rotor and/or vibration data of the rotor axis or of the rotor and/or positive and/or negative acceleration and/or a blockage of the rotor and/or data on operating states above a limit temperature, as a time measurement and/or sensor unit data relating to self-supply and energy management.

12. The system according to claim 1, wherein power and/or operation of the electric motor is controlled based on temperature-based measured values and further additional measured values or data or information derived therefrom.

\* \* \* \* \*